United States Patent
Fujiwara

(10) Patent No.: US 12,163,021 B2
(45) Date of Patent: Dec. 10, 2024

(54) COPOLYMER AND COMPOSITE RESIN

(71) Applicant: NIPPON SHOKUBAI CO., LTD., Osaka (JP)

(72) Inventor: Makoto Fujiwara, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 391 days.

(21) Appl. No.: 17/615,333

(22) PCT Filed: May 29, 2020

(86) PCT No.: PCT/JP2020/021321
§ 371 (c)(1),
(2) Date: Nov. 30, 2021

(87) PCT Pub. No.: WO2020/246381
PCT Pub. Date: Dec. 10, 2020

(65) Prior Publication Data
US 2022/0220302 A1    Jul. 14, 2022

(30) Foreign Application Priority Data
Jun. 6, 2019   (JP) ................. 2019-106372

(51) Int. Cl.
| C08L 69/00 | (2006.01) |
| C08F 220/14 | (2006.01) |
| C08F 226/06 | (2006.01) |
| C08L 33/12 | (2006.01) |
| C08L 101/02 | (2006.01) |
| C08L 101/06 | (2006.01) |

(52) U.S. Cl.
CPC ............ *C08L 69/00* (2013.01); *C08F 220/14* (2013.01); *C08F 226/06* (2013.01); *C08L 33/12* (2013.01); *C08L 101/02* (2013.01); *C08L 101/06* (2013.01)

(58) Field of Classification Search
CPC ......... C08L 69/00; C08L 33/12; C08F 220/14
See application file for complete search history.

(56) References Cited

U.S. PATENT DOCUMENTS

| 5,055,523 | A | 10/1991 | Inoue et al. |
| 6,703,077 | B1 | 3/2004 | Chu et al. |

FOREIGN PATENT DOCUMENTS

| JP | H037758 A | 1/1991 |
| JP | H05239331 A | 9/1993 |
| JP | H09031317 A | 2/1997 |
| JP | H1017747 A | * 1/1998 |
| JP | 2008056798 A | 3/2008 |
| JP | 2010116501 A | 5/2010 |
| JP | 2010174218 A | 8/2010 |
| JP | 5039387 B2 | 10/2012 |
| JP | 2016117849 A | 6/2016 |
| JP | 2018104509 A | 7/2018 |

OTHER PUBLICATIONS

Glass Transition Temperature of Polymers_Polymer Handbook 2005 (Year: 2005).*
Jerca et al. Poly(2-isopropenyl-2-oxazoline) as versatile platform towards thermoresponsive polymers, ESI for Polymer Chemistry, The Royal Society of Chemistry 2018 (Year: 2018).*
Chinese Decision of Rejection dated Oct. 23, 2023, which issued in the corresponding Chinese Patent Application No. 202080040894.0, including English machine translation.
Teijin Europe: "General Information Panlite L-1250Y", Feb. 13, 1996 (Feb. 13, 1996), pp. 1-2, XP093027628, Retrieved from the Internet: URL:http://www.fredixinternational.com/wp-content/uploads/2016/02/PCI 1250Y. pdf. [retrieved on Feb. 28, 2023].
Supplementary European Search Report dated Mar. 14, 2023, which issued in the corresponding European Patent Application No. 20817748.5.
Chinese Office Action dated Mar. 30, 2023, which issued in the corresponding Chinese Patent Application No. 202080040894.0, including English machine translation.
Chinese Office Action dated Sep. 15, 2022, which issued in the corresponding Chinese Patent Application No. 202080040894.0, including English translation.
Notice of Reasons for Refusal dated Aug. 30, 2022, which issued in the corresponding Japanese Patent Application No. 2021-524811, including English machine translation.
Decision of Refusal dated Nov. 8, 2022, which issued in the corresponding Japanese Patent Application No. 2021-524811, including English machine translation.
International Search Report dated Aug. 11, 2020, which issued in the corresponding PCT Patent Application No. PCT/JP2020/021321, including English Translation.
Jerca, V. V. et al., Synthesis and characterization of side-chain oxazoline-methyl methacrylate copolymers bearing azo-dye, Reactive & Functional Polymers, 2010, 70, 827-835.
European Office Action dated May 7, 2024, which issued in the corresponding European Patent Application No. 20817748.5.

* cited by examiner

*Primary Examiner* — Marc S Zimmer
*Assistant Examiner* — Surbhi M Du
(74) *Attorney, Agent, or Firm* — Dickinson Wright PLLC

(57) ABSTRACT

The object of the present invention is to provide a (meth)acrylic polymer capable of modifying various thermoplastic resins while suppressing or preventing the degradation of various properties derived from the thermoplastic resins.
A copolymer for modifying an acidic proton-containing thermoplastic resin, comprising an oxazoline group-containing monomer unit and a (meth)acrylate unit, wherein a content of the oxazoline group-containing monomer unit is 1 part by mass or more relative to 100 parts by mass of all monomer units.

12 Claims, No Drawings

COPOLYMER AND COMPOSITE RESIN

TECHNICAL FIELD

The present invention relates to a technique for using a copolymer, and in particular, relates to a technique for modifying an acidic proton-containing thermoplastic resin using the copolymer.

BACKGROUND ART

A (meth)acrylic polymer is excellent in various physical properties such as transparency and hardness, and may be used as a modifier. For example, Patent Documents 1 and 2 describe that the addition of an acrylic modifier that is an acrylic polymer to a polycarbonate resin improves the surface hardness of the polycarbonate resin. However, when the acrylic modifier is added to the polycarbonate resin, white turbidity occurs in the resin obtained after the addition of the modifier, which results in an inability to take advantage of good transparency of the (meth)acrylic polymer. Given this situation, in Patent Document 1, the degradation of transparency of the resin obtained after the addition of the acrylic modifier is suppressed by copolymerizing methyl methacrylate with an aromatic (meth)acrylate. Further, in Patent Document 2, the degradation of transparency of the resin obtained after the addition of the acrylic modifier is suppressed by adding a copolymer in which polymethylmethacrylate is grafted onto a polycarbonate main chain as a third component.

RELATED ART DOCUMENTS

Patent Documents

Patent Document 1: Japanese Laid-Open Patent Publication No. 2010-116501
Patent Document 2: Japanese Laid-Open Patent Publication No. 2016-117849

SUMMARY OF THE INVENTION

Problems to be Solved by the Invention

However, the aromatic (meth)acrylate and the polycarbonate main chain as copolymerizable components are both used for the purpose of improving the affinity with an aromatic ring in the polycarbonate resin and cannot be applied to thermoplastic resins other than polycarbonate resins, and the scope of application of this technique is limited to polycarbonate resins. In addition, if a copolymerizable component has an aromatic ring, the optical properties and weather resistance may be poor.

Therefore, an object of the present invention is to provide a (meth)acrylic polymer capable of modifying various thermoplastic resins while suppressing or preventing the degradation of various properties derived from the thermoplastic resins.

Solutions to the Problems

The present inventor made intensive studies, and as a result, has found that, when a copolymer obtained by copolymerizing a (meth)acrylic monomer with an oxazoline group-containing monomer is used as a modifier, and an acidic proton-containing thermoplastic resin is used as a thermoplastic resin, it is possible to modify the thermoplastic resin while suppressing or preventing the degradation of various properties derived from the thermoplastic resin. The present invention has been completed based on this finding.

One aspect of the present invention is a copolymer for modifying an acidic proton-containing thermoplastic resin which, comprises an oxazoline group-containing monomer unit and a (meth)acrylate unit, wherein a content of the oxazoline group-containing monomer unit is 1 part by mass or more relative to 100 parts by mass of all monomer units.

Another aspect of the present invention is a copolymer, which comprises an oxazoline group-containing monomer unit and a (meth)acrylate unit, wherein a content of the oxazoline group-containing monomer unit is 1 part by mass or more relative to 100 parts by mass of all monomer units, and wherein the copolymer has a Hazen unit color number, as determined in accordance with JIS K0071, of 80 or less.

Yet another aspect of the present invention is a composite resin, which comprises a copolymer having an oxazoline group-containing monomer unit and a (meth)acrylate unit, wherein a content of the oxazoline group-containing monomer unit is 1 part by mass or more relative to 100 parts by mass of all monomer units, and an acidic proton-containing thermoplastic resin.

Effects of the Invention

According to the present invention, it is possible to modify a certain thermoplastic resin while suppressing or preventing the degradation of various properties derived from the thermoplastic resin.

MODE FOR CARRYING OUT THE INVENTION (1) Copolymer

The copolymer of the present invention has an oxazoline group-containing monomer unit and a (meth)acrylate unit. The oxazoline group-containing monomer unit and the (meth)acrylate unit may form a block copolymer or a random copolymer, and preferably form a random copolymer. By having the (meth)acrylate unit in the copolymer, the thermoplastic resin can be modified. Furthermore, by having the oxazoline group-containing monomer unit in the copolymer, a bond between an acidic proton of the thermoplastic resin and the copolymer can be formed, and the thermoplastic resin can be modified while the degradation of various properties derived from the thermoplastic resin is suppressed or prevented.

The above oxazoline group-containing monomer may be a compound having a polymerizable double bond and an oxazoline group, and may or may not have an aromatic ring, but preferably has no aromatic ring. A copolymer derived from an oxazoline group-containing monomer having no aromatic ring is excellent in optical properties and weather resistance. Examples of an oxazoline group-containing monomer include a compound in which an oxazoline ring is bonded to an alkylene group having 2 to 4 carbon atoms, such as vinyloxazolines, isopropenyloxazolines, and allyloxazolines. Among these, as an oxazoline group-containing monomer having no aromatic ring, the following monomers can be exemplified.

Examples of the vinyloxazolines include a vinyloxazoline such as 2-vinyl-2-oxazoline, and the vinyloxazoline may optionally have a substituent. Examples of a vinyloxazoline having a substituent include alkyl-vinyloxazolines such as $C_{1-20}$alkyl-vinyloxazoline (preferably $C_{1-10}$alkyl-vinyloxazoline, and more preferably mono- or di-$C_{1-4}$alkyl-vinyloxazoline) such as 2-vinyl-4-methyl-2-oxazoline, 2-vinyl-4,4- dimethyl-2-oxazoline, 2-vinyl-4-ethyl-2-oxazoline, 2-vinyl-4-propyl-2-oxazoline, 2-vinyl-4-butyl-2-oxazoline, 2-vinyl-5-methyl-2-oxazoline, 2-vinyl-5-ethyl-2-oxazoline, 2-vinyl-5-propyl-2-oxazoline, and 2-vinyl-5-butyl-2-oxazoline.

Examples of the isopropenyloxazolines include an isopropenyloxazoline such as 2-isopropenyl-2-oxazoline, and the isopropenyloxazoline may optionally have a substituent. Examples of an isopropenyloxazoline having a substituent include alkyl-isopropenyloxazolines such as $C_{1-20}$alkyl-isopropenyloxazoline (preferably $C_{1-10}$alkyl-isopropenyloxazoline, and more preferably mono- or di-$C_{1-4}$alkyl-isopropenyloxazoline) such as 2-isopropenyl-4-methyl-2-oxazoline, 2-isopropenyl-4,4-dimethyl-2-oxazoline, 2-isopropenyl-4-ethyl-2-oxazoline, 2-isopropenyl-4-propyl-2-oxazoline, 2-isopropenyl-4-butyl-2-oxazoline, 2-isopropenyl-5-methyl-2-oxazoline, 2-isopropenyl-5-ethyl-2-oxazoline, 2-isopropenyl-5-propyl-2-oxazoline, and 2-isopropenyl-5-butyl-2-oxazoline.

The oxazoline group-containing monomer may be used alone or in combination of two or more.

As the oxazoline group-containing monomer, isopropenyloxazolines are preferable, and 2-isopropenyl-2-oxazoline is more preferable.

The content of the oxazoline group-containing monomer unit is, for example, 1 part by mass or more, preferably 4 parts by mass or more, and more preferably 7 parts by mass or more relative to 100 parts by mass of all monomer units in the copolymer. As the content of the oxazoline group-containing monomer unit increases, the more it tends to suppress or prevent the deterioration of various properties derived from the thermoplastic resin while modifying the thermoplastic resin. The content of the oxazoline group-containing monomer unit is, for example, 40 parts by mass or less, preferably 35 parts by mass or less, and more preferably 30 parts by mass or less, and may be 20 parts by mass or less, relative to 100 parts by mass of all monomer units in the copolymer. As the content of the oxazoline group-containing monomer unit decreases, the (meth)acrylate unit can be contained in a larger amount in the copolymer, and the effect of modifying the thermoplastic resin tends to increase.

Examples of a (meth)acrylate constituting the (meth)acrylate unit of the copolymer include a compound in which a linear, branched or cyclic aliphatic hydrocarbon group, or an aromatic hydrocarbon group is bonded to an oxygen atom of an ester bond in a (meth)acrylic acid; and a (meth)acrylate having a polar functional group.

Examples of a (meth)acrylic acid ester having a linear or branched aliphatic hydrocarbon group include alkyl (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, pentyl (meth)acrylate, n-hexyl (meth)acrylate, and 2-ethylhexyl (meth)acrylate. The number of carbon atoms of the linear or branched aliphatic hydrocarbon group such as alkyl group is 1 or more, and for example, 18 or less, preferably 12 or less, more preferably 8 or less, and particularly preferably 4 or less.

Examples of a (meth)acrylic acid ester having a cyclic aliphatic hydrocarbon group include cycloalkyl (meth)acrylates such as cyclopropyl (meth)acrylate, cyclobutyl (meth)acrylate, cyclopentyl (meth)acrylate, and cyclohexyl (meth)acrylate; and bridged-cyclic (meth)acrylates such as isobornyl (meth)acrylate. The number of carbon atoms of the cyclic aliphatic hydrocarbon group such as the cycloalkyl group and the bridged ring is, for example, 3 or more, preferably 4 or more, and more preferably 5 or more, and is, for example, 20 or less, preferably 12 or less, and more preferably 10 or less.

Examples of a (meth)acrylic acid ester having an aromatic hydrocarbon group include aryl (meth)acrylates such as phenyl (meth)acrylate, tolyl (meth)acrylate, xylyl (meth)acrylate, naphthyl (meth)acrylate, binaphthyl (meth)acrylate, and anthryl (meth)acrylate; and aralkyl (meth)acrylates such as benzyl (meth)acrylate. The number of carbon atoms of the aryl group in the aryl (meth)acrylate is preferably 6 or more, and preferably 20 or less, and more preferably 14 or less. The number of carbon atoms of the aralkyl group in the aralkyl (meth)acrylate is preferably 7 or more, and is preferably 14 or less, and more preferably 12 or less.

Examples of a (meth)acrylate having a polar functional group include a hydroxy group-containing (meth)acrylate, an alkoxy group-containing (meth)acrylate, an aryloxy group-containing (meth)acrylate, and a cyclic ether group-containing (meth)acrylate.

Examples of the hydroxy group-containing (meth)acrylate include hydroxy $C_{2-10}$alkyl (meth)acrylates such as 2-hydroxyethyl (meth)acrylate; and 2-(hydroxy $C_{1-2}$alkyl) $C_{1-10}$alkyl acrylates such as methyl 2-(hydroxymethyl)acrylate and ethyl 2-(hydroxymethyl)acrylate. Examples of the alkoxy group-containing (meth)acrylate include alkoxyalkyl (meth)acrylates (preferably $C_{1-10}$alkoxy $C_{2-10}$alkyl (meth)acrylate) such as 2-methoxyethyl (meth)acrylate. Examples of the aryloxy group-containing (meth)acrylate include arylalkyl (meth)acrylates (preferably $C_{6-12}$aryl $C_{2-10}$alkyl (meth)acrylate) such as phenoxyethyl (meth)acrylate. Examples of the cyclic ether group-containing (meth)acrylate include epoxy group-containing (meth)acrylates such as glycidyl (meth)acrylate.

The (meth)acrylate may be used alone or in combination of two or more.

As the (meth)acrylate, a (meth)acrylate having no aromatic ring is preferable. When a (meth)acrylate has no aromatic ring, the optical properties and weather resistance of the obtained copolymer tend to become better. As the (meth)acrylate, an alkyl (meth)acrylate is more preferable, a $C_{1-4}$alkyl (meth)acrylate is further preferable, a $C_{1-4}$alkyl methacrylate is particularly preferable, and methyl methacrylate is most preferable.

The content of the (meth)acrylate unit is, for example, 50 parts by mass or more, preferably 60 parts by mass or more, and more preferably 65 parts by mass or more relative to 100 parts by mass of all monomer units in the copolymer. As the content of the (meth)acrylate unit increases, the effect of modifying the thermoplastic resin increases. Furthermore, the content of the (meth)acrylate unit is, for example, 98 parts by mass or less, preferably 97 parts by mass or less, and more preferably 92 parts by mass or less, and may be 80 parts by mass or less, relative to 100 parts by mass of all monomer units in the copolymer.

The total content of the oxazoline group-containing monomer unit and the (meth)acrylate unit is, for example, 60 parts by mass or more, preferably 80 parts by mass or more, more preferably 90 parts by mass or more, and particularly preferably 95 parts by mass or more, and may be 100 parts by mass, relative to 100 parts by mass of all monomer units in the copolymer.

The above-mentioned copolymer may have monomer units other than the oxazoline group-containing monomer unit and the (meth)acrylate unit (hereinafter, referred to as "other monomer units"). Examples of other monomers constituting the other monomer units include styrene monomers; maleimide monomers such as maleimide, N-methylmaleimide, N-ethylmaleimide, N-cyclohexylmaleimide, N-phenylmaleimide, N-naphthylmaleimide, and N-benzylmaleimide; maleic anhydride derivatives such as maleic anhydride optionally having a substituent; a (meth)acrylamide monomer optionally having a substituent, such as (meth) acrylamide and N-methyl (meth)acrylamide; vinyl esters such as vinyl acetate and vinyl propionate; unsaturated nitriles such as acrylonitrile and methacrylonitrile; vinyl ethers such as alkyl vinyl ethers (for example, methyl vinyl ether, ethyl vinyl ether, and the like); olefin monomers (preferably an olefin monomer having 2 to 10 carbon atoms) such as ethylene, propylene, 1-butene, isobutylene, and 1-octene; and halogenated olefin monomers (preferably a halogenated olefin monomer having 2 to 10 carbon atoms) such as vinyl chloride, vinylidene chloride, and vinyl fluoride.

Examples of the styrene monomers include styrene; α-alkylstyrenes (preferably α-$C_{1-4}$alkylstyrene) such as α-methylstyrene; alkylstyrenes (preferably $C_{1-4}$alkylstyrene) such as vinyltoluene; and halostyrenes such as chlorostyrene.

These other monomers may be used alone or in combination of two or more.

It is also preferable to have a unit with a ring structure on the main chain of the copolymer in addition to the oxazoline group-containing monomer unit and the (meth)acrylate unit. By having the unit with a ring structure on the main chain of the copolymer, the copolymer tends to have an increased heat resistance.

Examples of the ring structure include a lactone ring structure, a ring structure derived from maleimide or maleic anhydride (hereinafter each referred to as a maleimide structure or a maleic anhydride structure), a glutaric anhydride structure, and a glutarimide structure. Such a ring structure may be formed by converting a part or all of (meth)acrylate units into a ring structure, or may be derived from other monomers.

The lactone ring structure can be formed, for example, from a copolymerization structure of a (meth)acrylic acid ester with a 2-(hydroxy $C_{1-2}$alkyl)$C_{1-10}$alkyl acrylate by cyclization with dealcoholization between an ester bond of the (meth)acrylic acid ester and a hydroxy group of the 2-(hydroxy $C_{1-2}$alkyl)$C_{1-10}$alkyl acrylate. The maleimide structure or maleic anhydride structure can be introduced by copolymerizing a maleimide monomer or a maleic anhydride derivative as other monomers. The glutaric anhydride structure or glutarimide structure can be formed by forming an acid anhydride in adjacent (meth)acrylic acid ester units or by imidization of the acid anhydride, or can be formed by imidization between adjacent (meth)acrylic acid ester unit and (meth)acrylamide unit.

The copolymer has a weight average molecular weight (Mw) of, for example, 3,000 or more, preferably 10,000 or more, more preferably 20,000 or more, still more preferably 23.000 or more, and particularly preferably 25,000 or more. The weight average molecular weight is, for example, 1,000,000 or less, preferably 500,000 or less, more preferably 300,000 or less, particularly preferably 150,000 or less, and most preferably 80,000 or less.

The copolymer has a molecular weight distribution (weight average molecular weight (Mw)/number average molecular weight (Mn)) of, for example, 1.5 or more, preferably 2.0 or more, and more preferably 2.3 or more, and for example, 8 or less, preferably 5.0 or less, and more preferably 3.5 or less.

The copolymer has a glass transition temperature of, for example, 70° C. or higher, preferably 80° C. or higher, and more preferably 90° C. or higher. As the glass transition temperature increases, the thermoplastic resin can be modified at a higher temperature. The glass transition temperature is, for example, 150° C. or lower, preferably 140° C. or lower, and more preferably 130° C. or lower.

The glass transition temperature of the copolymer is calculated by the following Fox Equation (where wi refers to a mass ratio of monomer i, and Tgi refers to a glass transition temperature (° C.) of a homopolymer of monomer i).

$$1/(Tg+273)=\Sigma[wi/(Tgi+273)]$$

For the Tg of the homopolymer of the monomer used in the FOX Equation, for example, the value described in "POLYMER HANDBOOK THIRD EDITION" (written by J. BRANDRUP and E. H. IMMERGUT published by John Wiley & Sons, Inc. (1989), pp. VI/209 through VI/277) (the lowest value when a plurality of glass transition temperatures is described) may be adopted. For monomers that are not described in "POLYMER HANDBOOK THIRD EDITION", a value obtained by a computer using commercially available glass transition temperature calculation software (for example, "MATERIALS STUDIO" manufactured by Accelrys Software Inc., version: 4.0.0.0, module: Synthia, condition: calculated with a weight average molecular weight of 100,000) can be used. For monomers that cannot obtain values using the above software, the glass transition temperature can be obtained by polymerizing the monomer.

The copolymer may be colored, but it is preferred that the copolymer be less colored because the transparency of the copolymer can be effectively utilized. The copolymer has a Hazen unit color number as determined in accordance with JIS K0071 of, for example, 500 or less, preferably 300 or less, more preferably 150 or less, still more preferably 80 or less, and most preferably 60 or less. A copolymer having an oxazoline group-containing monomer unit and a (meth)acrylate unit and having a Hazen unit color number of 80 or less has not been known so far. The copolymer may have a Hazen unit color number of, for example, 1 or more, and particularly 10 or more. The copolymer that is less colored can be produced by appropriately selecting a polymerization initiator at the time of copolymerization.

The copolymer can be produced by polymerizing predetermined monomers using a polymerization initiator. The polymerization method may be any of bulk polymerization, solution polymerization, suspension polymerization, and emulsion polymerization, and solution polymerization is preferable.

Examples of the polymerization initiator include an organic peroxide, an azo-based initiator (such as azobisisobutyronitrile), a persulfate, and an inorganic peroxide (such as ammonium persulfate), and the organic peroxide is preferable.

Examples of the organic peroxide include a diacyl peroxide such as benzoyl peroxide; an organic peroxide having a $C_{1-4}$alkylperoxy group such as tert-butylperoxy isopropyl carbonate or tert-butylperoxy2-ethylhexanoate; and an organic peroxide having an ROO— group (where R represents an aliphatic hydrocarbon group having 5 or more carbon atoms), and an organic peroxide having an ROO— group is preferable. When polymerization is performed using an organic peroxide having an ROO— group, it is possible to suppress coloring of the copolymer and to adjust the weight average molecular weight, the molecular weight distribution, and the like of the copolymer within preferable ranges.

Examples of the organic peroxide having an ROO— group include dialkyl peroxides such as di-tert-hexyl peroxide; alkylperoxy alkyl monocarbonates such as tert-amylperoxy isopropyl carbonate and tert-hexylperoxy isopropyl carbonate; alkylperoxy alkanoates such as tert-amylperoxyacetate, tert-amylperoxy-2-ethylhexanoate, tert-amylperoxy-3,5,5-trimethylhexanoate, tert-hexylperoxy-2-ethylhexanoate, tert-hexylperoxy neodecanoate, 1,1,3,3-tetramethylbutyl peroxyacetate, 1,1,3,3-tetramethylbutyl peroxy-2-ethylhexanoate, and 1,1,3,3-tetramethylbutyl peroxy neodecanoate; alkylperoxy benzoates such as tert-hexylperoxy benzoate; and 1,1-di(alkylperoxy)cycloalkanes such as 1,1-di(tert-hexylperoxy)cyclohexane.

Since the copolymer has the (meth)acrylate unit, the thermoplastic resin can be modified with at least one property selected from excellent properties that poly(meth)acrylate has, such as transparency, hardness, tensile strength, impact strength, heat resistance, weather resistance, processability, adhesion, compatibility, and dispersibility of pigments and inorganic fibers. Preferably, it is possible to increase the hardness of the thermoplastic resin.

(2) Thermoplastic Resin

As a thermoplastic resin to be modified, an acidic proton-containing thermoplastic resin is selected. Even when the above-mentioned copolymer is added to an acidic proton-containing thermoplastic resin, the thermoplastic resin is modified while the degradation of various properties is suppressed or prevented. The combination of a property whose degradation is suppressed or prevented and a property to be improved is appropriately determined according to the type of thermoplastic resin. One or more properties of resistance to white turbidity, transparency, heat resistance, hardness, and tensile strength can be selected as properties whose degradations are suppressed or prevented, and one or more properties of resistance to white turbidity, transparency, heat resistance, hardness, and tensile strength can be selected as properties to be improved. Preferably, it is possible to improve hardness or tensile strength (more preferably, hardness) while suppressing the degradation of one or more properties of resistance to white turbidity, transparency, tensile strength, and heat resistance (more preferably, while preventing the degradation of one or more properties of resistance to white turbidity, transparency, and tensile strength). While the thermoplastic resin is modified by utilizing the excellent properties (particularly preferably hardness) of the (meth)acrylate unit, the degradation in performance of the thermoplastic resin can be suppressed or prevented by forming a given copolymer using the (meth) acrylate unit.

The acidic proton is derived from an acidic proton-containing group such as a phenolic hydroxyl group, a thiophenolic SH group, or a carboxylic acid group. The acidic proton-containing group is preferably at a terminal of a molecular chain. Examples of a resin having the acidic proton-containing group include a polycondensate-based resin, a polyether-based resin, and a polythioether-based resin.

Examples of the polycondensate-based resin having the acidic proton-containing group at a terminal of the molecular chain include a polycondensate-based resin 1 having a phenolic hydroxyl group at a terminal of the molecular chain, such as polycarbonate, polyarylate, polysulfone, polyethersulfone, polyetheretherketone, or polyetherketone; a resin in which the phenolic hydroxyl group of the polycondensate-based resin 1 is replaced with a thiophenolic hydroxyl group; and a polycondensate-based resin having a carboxylic acid group at a terminal of the molecular chain, such as polycarbonate, polyarylate, or polyamide.

Examples of the polyether-based resin include a polyether-based resin having a phenolic hydroxyl group at a terminal of the molecular chain, such as polyphenylene ether.

Examples of the polythioether-based resin include a polythioether-based resin having a thiophenolic hydroxyl group at a terminal of the molecular chain, such as polyphenylene sulfide.

The acidic proton-containing thermoplastic resin may be used alone or in combination of two or more. As the acidic proton-containing thermoplastic resin, a polycondensate-based resin having a carboxylic acid group at a terminal of the molecular chain, such as polycarbonate, polyarylate, or polyamide, is preferable, a resin having a carboxylic acid group at one terminal of the molecular chain and a phenolic hydroxyl group at the other terminal of the molecular chain, such as polycarbonate or polyarylate, is more preferable, and polycarbonate is particularly preferable.

The content of the copolymer to modify the acidic proton-containing thermoplastic resin is, for example, 1 part by mass or more, preferably 5 parts by mass or more, and more preferably 10 parts by mass or more relative to 100 parts by mass of the acidic proton-containing thermoplastic resin. As the content of the copolymer increases, the modification effect increases. The content of the copolymer is, for example, 45 parts by mass or less, preferably 40 parts by mass or less, and more preferably 35 parts by mass or less relative to 100 parts by mass of the acidic proton-containing thermoplastic resin. As the content of the copolymer decreases, it becomes easier to maintain the properties of the acidic proton-containing thermoplastic resin.

The acidic proton-containing thermoplastic resin is, for example, kneaded (preferably melt-kneaded) in the presence of the copolymer and thereby turned into a composite resin (polymer alloy), whereby the thermoplastic resin is modified. Since the copolymer is composed of specific monomer units, the copolymer is uniformly dispersed in the composite resin even when the acidic proton-containing thermoplastic resin and the copolymer are contained.

Therefore, in the composite resin, the thermoplastic resin can be modified while the degradation of various properties derived from the acidic proton-containing thermoplastic resin is suppressed or prevented.

It is preferable that the copolymer be compatible with the acidic proton-containing thermoplastic resin in the composite resin, and there be no interface between the copolymer and the thermoplastic resin. Even when there exists the interface, it is preferable that the copolymer be finely dispersed in the thermoplastic resin. When the copolymer is compatible with the acidic proton-containing thermoplastic resin, or when the copolymer is finely dispersed in the thermoplastic resin, the modification effect can be easily obtained while the degradation of various properties derived from the acidic proton-containing thermoplastic resin (more accurately, the composite resin) is suppressed or prevented. When there exists the interface, a sea-island structure in which the thermoplastic resin constitutes the sea and the copolymer constitutes the islands is formed. 99% or more (on a number basis) of the islands of the copolymer preferably have an equivalent circle diameter of 0.3 µm or less, more preferably 0.1 µm or less, and even more preferably less than 0.1 µm.

The dimensions of the islands in the sea-island structure can be determined by measuring the cross section of the composite resin in a viscoelastic mode of an atomic force microscope. The detailed conditions are similar to those described in the examples described later.

In the above-mentioned composite resin, while the degradation of various properties (for example, one or more properties of resistance to white turbidity, transparency, heat resistance, hardness, and tensile strength) is suppressed or prevented, the appropriate properties (for example, one or more properties of resistance to white turbidity, transparency, heat resistance, hardness, and tensile strength) are improved. Specifically, when the composite resin is formed into a film having a thickness of 100 μm, the film has a haze, for example, of 15% or less, preferably 10% or less, and more preferably 5% or less. Even if the haze is 1% or more, the transparency of the composite resin is sufficiently good.

Further, when the composite resin is formed into a film having a thickness of 100 μm, the film has a total light transmittance of, for example, 70% or more, preferably 80% or more, and more preferably 85% or more. The upper limit of the total light transmittance may be about 99%, and particularly about 95%41).

The composite resin has a glass transition temperature (Tg) of, for example, 100° C. or higher, preferably 110° C. or higher, and more preferably 115° C. or higher. The upper limit of the glass transition temperature (Tg) is not particularly limited, and may be, for example, about 200° C., and particularly about 140° C.

The composite resin has a pencil hardness of, for example, 5B or more, preferably 4B or more, and more preferably 3B or more. The pencil hardness can be increased to, for example, about F or about H.

The composite resin has a tensile strength as measured in accordance with JIS K6251 of, for example, 85 Mpa or more, preferably 95 Mpa or more, and more preferably 100 Mpa or more. The upper limit of the tensile strength is, for example, 150 MPa or less, preferably 140 MPa or less, and more preferably 130 MPa or less.

The composite resin containing an acidic proton-containing thermoplastic resin and the above-mentioned copolymer may contain an additive to form a resin composition if necessary. Examples of the additive include antioxidants such as hindered phenol-based, phosphorus-based, and sulfur-based antioxidants; stabilizers such as a light stabilizer, a weather stabilizer, and a heat stabilizer; reinforcing materials such as glass fiber and carbon fiber; an ultraviolet absorber; a near-infrared ray absorber; flame retardants such as tris(dibromopropyl) phosphate, triallyl phosphate, and antimony oxide; antistatic agents such as an anionic surfactant, a cationic surfactant, and a nonionic surfactant; colorants such as an inorganic pigment, an organic pigment, and a dye; an organic filler and an inorganic filler; a resin modifier; and an organic filler and an inorganic filler.

The composite resin or the resin composition containing the composite resin can be appropriately formed into a molded article. The molded article is not particularly limited, and examples thereof include articles with various forms including a film, a plate, and the like.

The present application claims priority based on Japanese Patent Application No. 2019-106372 filed on Jun. 6, 2019. All the contents described in Japanese Patent Application No. 2019-106372 filed on Jun. 6, 2019 are incorporated herein by reference.

EXAMPLES

Hereinafter, the present invention will be described in more detail by way of Examples. However, the present invention is not limited in any way to the form of these Examples, and appropriate modifications can also be added within the scope compatible with the gist described above and below, all of which are included in the technical scope of the present invention.

The evaluation methods of physical properties or characteristics in Examples and Comparative Examples are as follows.

[Molecular Weight]

The results obtained by gel permeation chromatography (GPC) were converted in terms of polystyrene to obtain a weight average molecular weight and a number average molecular weight.

[Hazen Unit Color Number]

In accordance with JIS K0071, the Hazen color number of a polymerized solution was measured by comparing with a standard solution using a colorimetric tube.

[Elastic Modulus Image (AFM)]

A resin solid was cut with an ultra-microtome, and the cross section was observed in a viscoelastic mode of an atomic force microscope (AFM). An AFM image (field of view: 5 μm×5 μm, resolution: sufficiently smaller than 0.1 μm) of a sea-island structure formed by discriminating between a hard area and a soft area was obtained, and equivalent circle diameters of island portions were determined. The smaller the equivalents circle diameters of the islands, the better the dispersibility.

AFM device: BRUKER Dimension Icon
Measurement mode: Peak Force Tapping mode (Air)
Probe: RTESPA-300 (spring constant=40 N/m)

[Preparation Method of Film]

Using a manual heat press (manufactured by Imoto Machinery Co., Ltd., IMC-180C type), resin pellets were subjected to melt press molding at a temperature of 250° C. and a pressure of 20 MPa for 3 minutes to prepare an unstretched film having a thickness of 100 μm.

[Haze and Total Light Transmittance]

The haze and total light transmittance were measured using a turbidity meter (manufactured by Nippon Denshoku Industries Co., Ltd., product number: NDH 5000).

[Heat Resistance (Glass Transition Temperature; Tg)]

A glass transition temperature is a value obtained in accordance with JIS K7121. More specifically, using a differential scanning calorimeter (manufactured by Rigaku Co., Ltd., trade name: Thermo plus EVO DSC-8230) and using α-alumina as a reference, about 10 mg of (meth)acrylic resin is heated from room temperature to 200° C. at a temperature rise rate of 20° C./min in a nitrogen gas atmosphere to obtain a DSC curve, and a glass transition temperature is determined from the obtained DSC curve according to the starting point method.

[Pencil Hardness]

In accordance with JIS K5600-5-4 (1999), the measurement was performed under a load of 1000 g using a pencil scratch hardness tester (manufactured by Yasuda Seiki Seisakusho, Ltd.).

[Tensile Strength]

A film was punched into a dumbbell-like No. 2 shape prescribed in 6.1 of JIS K6251 to obtain a test piece. The obtained test piece was attached to a tensile tester (manufactured by Shimadzu Corporation, trade name: Autograph AGS-100D) so that the distance between chucks of the tensile tester was 20 mm, and pulled under the conditions of a temperature of 20° C. and a peeling speed of 200 mm/min to measure a tensile strength (maximum tensile stress).

Example 1

A raw material mixed solution composed of 100 parts by mass of toluene, 30 parts by mass of 2-isopropenyl-2- oxazoline (IPO), and 70 parts by mass of methyl methacrylate (MMA) was prepared. This raw material mixed solution was divided in a mass ratio of 40:60, the solution corresponding to 40% by mass was designated as a raw material mixed solution 1, and the solution corresponding to 60% by mass was designated as a raw material mixed solution 2. To the raw material mixed solution 2, 5 parts by mass of tert-amylperoxy-3,5,5-trimethylhexanoate (manufactured by Kayaku Akzo Corp., trade name: Kayaester AN) was mixed as a polymerization initiator and the resulting mixture was designated as a raw material mixed solution 3.

Into a 2 L flask equipped with a stirrer, a dropping inlet, a thermometer, a condenser, and a nitrogen gas introduction tube was put the raw material mixed solution 1. Nitrogen gas was blown into the flask for 10 minutes to replace the atmosphere in the flask with nitrogen gas, and then the temperature was raised to 100° C. with stirring in the flask. Thereafter, the raw material mixed solution 3 was continuously added dropwise into the flask over 3 hours (that is, polymerizable component concentration of 50% by mass), and heating was then continued for 5 hours to complete the reaction. The content inside the flask was cooled to 25° C. to obtain an oxazoline-based polymer solution (polymerization liquid 1) containing a polymer at a concentration of 50% by mass.

The obtained polymerization liquid 1 was cooled and slowly added to a large amount of n-hexane with stirring. The precipitated white solid was taken out and dried at a temperature of 90° C. for about 3 days to remove the solvent, thereby to obtain a copolymer 1.

Example 2

A copolymer 2 was obtained in the same manner as in Example 1 except that the amount of IPO was changed from 30 parts by mass to 10 parts by mass and the amount of MMA was changed from 70 parts by mass to 90 parts by mass.

Example 3

A copolymer 3 was obtained in the same manner as in Example 1 except that 2,2-azobis(isobutyronitrile) was used instead of tert-amylperoxy-3,5,5-trimethylhexanoate.

Example 4

A copolymer 4 was obtained in the same manner as in Example 1 except that tert-butylperoxy-2-ethylhexanoate (manufactured by NOF Corporation, trade name: Perbutyl O) was used instead of tert-amylperoxy-3,5,5-trimethylhexanoate.

The properties of the copolymers 1 to 4 are shown in Table 1.

TABLE 1

|  | Example 1 | Example 2 | Example 3 | Example 4 |
|---|---|---|---|---|
| MMA (parts) | 70 | 90 | 70 | 70 |
| IPO (parts) | 30 | 10 | 30 | 30 |
| Toluene (parts) | 100 | 100 | 100 | 100 |
| Initiator | Kayaester AN | Kayaester AN | AIBN | PBO |
| Hazen color number (APHA) | 50 | 30 | 400 | 100 |
| Number average molecular weight (Mn) | 11,000 | 10,000 | 9,000 | 18,000 |
| Weight average molecular weight (Mw) | 31,000 | 29,000 | 17,000 | 98,000 |
| d(Mw/Mn) | 2.8 | 2.9 | 1.9 | 5.4 |
| Tg (° C.) (Theoretical value) | 100 | 100 | 100 | 100 |

Example 5

After 80 parts by mass of polycarbonate resin (PC) (manufactured by Teijin Limited, trade name: Panlite (registered trademark) L-1250Y, solid) and 20 parts by mass of the copolymer 1 (solid) were put into a labo plastomill, the mixture was kneaded at a temperature of 240° C. and a rotation rate of 100 rpm for 5 minutes. After the kneading, the resulting mixture was cooled to room temperature, thereby to obtain a modified polycarbonate resin 1 (solid).

Example 6

A modified polycarbonate resin 2 (solid) was obtained in the same manner as in Example 5 except that the copolymer 2 (solid) was used instead of the copolymer 1 (solid).

Comparative Example 1

A modified polycarbonate resin 3 (solid) was obtained in the same manner as in Example 5 except that polymethylmethacrylate (PMMA) (manufactured by Sumitomo Chemical Co., Ltd., trade name: Sumipex (registered trademark) MM) was used instead of the copolymer 1.

The properties of the modified polycarbonate resins 1 to 3 are shown in Table 2.

TABLE 2

|  | Reference | Example 5 | Example 6 | Com. Example 1 |
|---|---|---|---|---|
| PC resin | 100 | 80 | 80 | 80 |
| Copolymer 1 (IPO/MMA = 30/70) | — | 20 | — | — |
| Copolymer 2 (IPO/MMA = 10/90) | — | — | 20 | — |
| PMMA (IPO/MMA = 0/100) | — | — | — | 20 |
| Equivalent circle diameters of islands in elastic modulus image | — | Maximum less than 0.1 μm | Maximum less than 0.1 μm | About 0.7 μm |

TABLE 2-continued

|  | Reference | Example 5 | Example 6 | Com. Example 1 |
|---|---|---|---|---|
| Haze (%) | 3.4 | 3.7 | 3.6 | 98.2 |
| Total light transmittance (%) | 91 | 92 | 92 | 64 |
| Heat resistance (Tg) (° C.) | 151 | 123 | 126 | 113 |
| Pencil hardness | 6B | B | 2B | 4B |
| Tensile Strength (MPa) | 91 | 104 | 111 | 71 |

INDUSTRIAL APPLICABILITY

The copolymer of the present invention can be used to modify the acidic proton-containing thermoplastic resin.

The invention claimed is:

1. A composite resin comprising:
a copolymer comprising an oxazoline group-containing monomer unit and a (meth)acrylate unit, wherein a content of the oxazoline group-containing monomer unit is 1 part by mass or more relative to 100 parts by mass of all monomer units, and wherein the copolymer has a Hazen unit color number of 300 or less as determined in accordance with JIS K0071; and
an acidic proton-containing thermoplastic resin;
wherein the composite resin has a pencil hardness of 5B or more.

2. The composite resin according to claim 1,
wherein the copolymer and the thermoplastic resin exist in a state that there is no interface between the copolymer and the thermoplastic resin or in a state of a sea-island structure, and when dimensions of islands in the sea-island structure are measured in a viscoelastic mode of an atomic force microscope, 99% or more (on a number basis) of the islands have an equivalent circle diameter of 0.1 μm or less.

3. The composite resin according to claim 1, wherein a content of the copolymer is 1 to 100 parts by mass relative to 100 parts by mass of the acidic proton-containing thermoplastic resin.

4. The composite resin according to claim 1 having a tensile strength, as measured in accordance with JIS K6251, of 95 MPa or more.

5. The composite resin according to claim 1, wherein the composite resin when formed into a film having a thickness of 100 μm has a haze of 15% or less.

6. The composite resin according to claim 1, wherein the copolymer has a weight average molecular weight of 23,000 to 300,000.

7. The composite resin according to claim 1, wherein the copolymer has a Hazen unit color number of 80 or less.

8. The composite resin according to claim 1, wherein a content of the (meth) acrylate units in the copolymer is 50 parts by mass or more relative to 100 parts by mass of all monomer units in the copolymer.

9. The composite resin according to claim 1, wherein the copolymer has a molecular weight distribution (weight average molecular weight (Mw)/number average molecular weight (Mn)) of 1.5 to 8.

10. The composite resin according to claim 1, wherein the copolymer has a glass transition temperature (Tg) of 70° C. or higher.

11. The composite resin according to claim 1, wherein the composite resin when formed into a film having a thickness of 100 μm has a total light transmittance of 70% or more.

12. The composite resin according to claim 1 having a glass transition temperature (Tg) of 100° C. or higher.

* * * * *